No. 648,675. Patented May 1, 1900.
A. A. TRIPOLD.
PACKING FOR PISTON RODS.
(Application filed Dec. 29, 1899.)
(No Model.)

Witnesses:
J. Staib
Chas. H. Smith

Inventor:
Ambrose A. Tripold
per L. W. Serrell & Son
attys.

UNITED STATES PATENT OFFICE.

AMBROSE A. TRIPOLD, OF NEW YORK, N. Y.

PACKING FOR PISTON-RODS.

SPECIFICATION forming part of Letters Patent No. 648,675, dated May 1, 1900.

Application filed December 29, 1899. Serial No. 741,895. (No model.)

*To all whom it may concern:*

Be it known that I, AMBROSE A. TRIPOLD, a citizen of the United States, residing at New York, (Brooklyn,) in the county of Kings and State of New York, have invented an Improvement in Packings for Piston-Rods, of which the following is a specification.

Heretofore it has been difficult in engines carrying a high pressure of steam to effect a tight packing where the piston-rod passes through the stuffing-box and gland; and the object of my invention is to overcome this difficulty.

In carrying out my invention I employ a number of rings having inclined faces set in opposite directions. These are forced together by the gland of the stuffing-box in effecting a tight joint. These rings are preferably of such material as Babbitt metal in halves and in groups or pairs with a dividing-ring, and one ring of each pair is preferably flanged to receive the other ring of the pair, so as to insure tight joints at both the inclined surfaces of the pairs of rings. The divisions between the rings are staggered in relation to one another, and the arrangement of the parts is such as to cause a wedge-like compressing action, insuring the inner faces being forced against the surface of the piston-rod.

Figure 1:
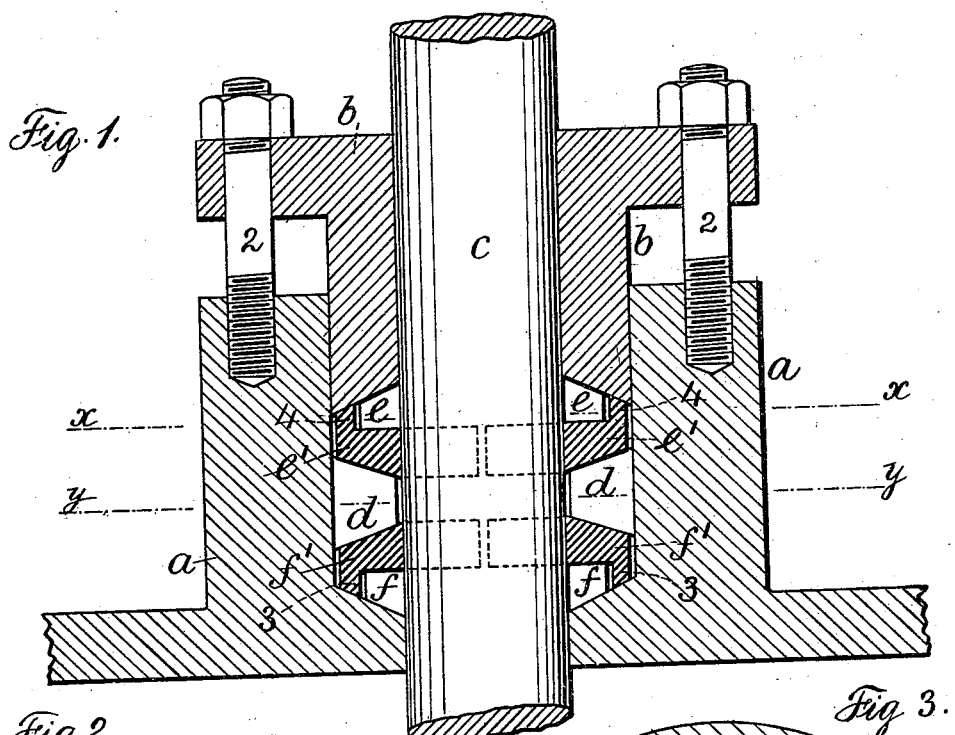
Figures 2, 3:
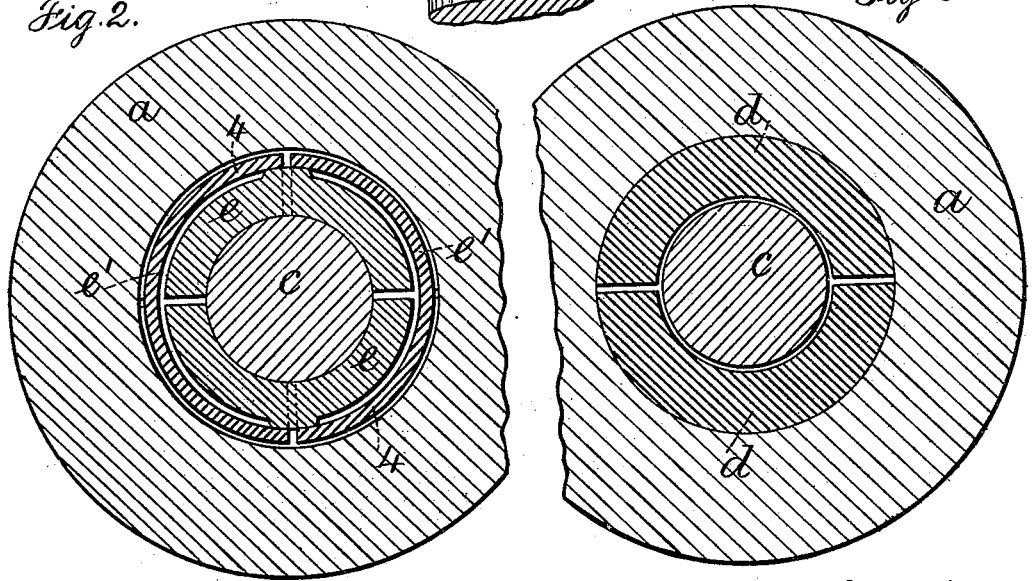

In the drawings, Figure 1 is a vertical section and partial elevation representing my improvement. Fig. 2 is a cross-section at $x\,x$ of Fig. 1, and Fig. 3 is a cross-section at $y\,y$ of Fig. 1.

The stuffing-box $a$ and the gland $b$, fitting therein, and the bolts 2 for holding the said parts together and for drawing the gland farther toward the stuffing-box are of usual character, the piston-rod $c$ passing through the gland and stuffing-box. The said stuffing-box and gland are made as usual for a packing within the stuffing-box and between the stuffing-box and gland.

In my present invention I employ pairs of rings, $e\,e'$ being the upper or outer pair and $f\,f'$ the lower pair, between which is the center ring $d$. The section $y\,y$ is taken through this center ring, showing that the same is divided, or, in other words, made of two approximately equal halves, with the outer face of the ring resting against the inner surface of the stuffing-box and the inner surface of the half-rings out of contact with the piston-rod $c$. The pairs of rings are alike, but reversed in position, and they are both composed of half-rings, with the divisions staggered in relation to one another, the section $x\,x$ being taken through the upper pair of half-rings and showing that the inner faces of said rings come in contact with the piston-rod and that their outer faces or peripheries are out of contact with one another and with the inner surface of the stuffing-box, except at the intersections of the half-rings $e\,f$ with the joints of the half-rings $e'\,f'$, the half-rings $e'$ having flanges 4 rising above the horizontal meeting faces of the rings $e'$.

The upper and lower faces of the half-rings are inclined in opposite directions. The under face of the gland and the lower face of the stuffing-box cavity are also inclined at corresponding angles, and the opposite faces of the pairs of half-rings, including their flanges 3 and 4, are also made with inclined surfaces at corresponding angles, so that the various parts set the one over the other within the cavity of the stuffing-box to form the packing for the piston-rod.

It will be readily seen that the pressure exerted by the gland $b$ when the bolts 2 are tightened tends to force the various half-rings of the packing together, the half-rings $d$ being forced outward against the inner surface of the stuffing-box cavity and the pairs of rings forced toward the surface of the piston-rod in closer and more intimate contact therewith and the horizontal meeting faces of the said pairs of half-rings forced into more intimate contact.

It will be noticed that the periphery of the half-rings $e\,f$ of the pairs do not touch the inner faces of the flanges of the half-rings $e'\,f'$ of the pairs, excepting at the intersections of the half-rings $e\,f$ with the joints of the half-rings $e'\,f'$, and that the periphery of the half-rings $e'\,f'$ are free from the inner surface of the stuffing-box cavity. Consequently the tendency of the pressure of the gland is not only to force the said half-rings together, but to force the half-rings of both pairs toward the piston-rod and to slightly compress the composition metal of which they are preferably composed, so that the spaces beyond the peripheries of the said half-rings provide for this compressing action as well as the space between the surface of the half-rings $d$, and the piston-rod provides for the slight compression of the said half-rings, and the further fact that the various divisions between the rings are staggered insures the functions of the various parts under compression and a tight packing in the stuffing-box through which it is impossible for steam to leak.

This packing responds very quickly to a slight tightening of the gland and the same effectually confines the steam within the cylinder and prevents the same leaking, the ample lubrication of the piston-rod providing sufficient ease of movement through the Babbitt or similar metal.

I claim as my invention—

1. In a piston-rod packing, the combination with the stuffing-box and gland and central half-rings with inclined faces in opposite directions, of pairs of half-rings having flat meeting faces and inclined opposite faces, the said pairs coming at either side of the center ring and setting in opposite directions and having peripheries contacting at their intersections, substantially as set forth.

2. In a piston-rod packing, the combination with the stuffing-box and gland and central half-rings with inclined faces in opposite directions, of pairs of half-rings having flat meeting faces and inclined opposite faces, the said pairs coming at either side of the center ring and setting in opposite directions, one of the pairs of half-rings being smaller than the other pair of half-rings, and the one of largest diameter having flanges extending outside of the smaller half-rings, substantially as and for the purposes set forth.

3. In a piston-rod packing, the combination with the stuffing-box and the gland, of the center half-rings $d$ with their peripheries in contact with the inner surface of the stuffing-box cavity, and their inner surface free from the piston-rod, the half-rings $e\ e'$ and $f\ f'$ in pairs at either side of the ring $d$ with their inner faces in contact with the piston-rod, and the outer edges or peripheries of the half-rings $e'$ $f'$ free from the inner surface of the stuffing-box cavity and their adjacent edges or peripheries free from each other except at the intersections of the outer half-rings with the inner half-rings, the said center ring and the pairs of rings having inclined outer faces in contact with each other and with the end of the gland and the end of the stuffing-box cavity and the said pairs of half-rings having flat meeting faces, substantially as and for the purposes set forth.

Signed by me this 22d day of December, 1899.

AMBROSE A. TRIPOLD.

Witnesses:
J. S. STETSON.
WILSON GODFREY.